(No Model.)
L. YOUNG.
HEDGE FENCE.
No. 591,716. Patented Oct. 12, 1897.
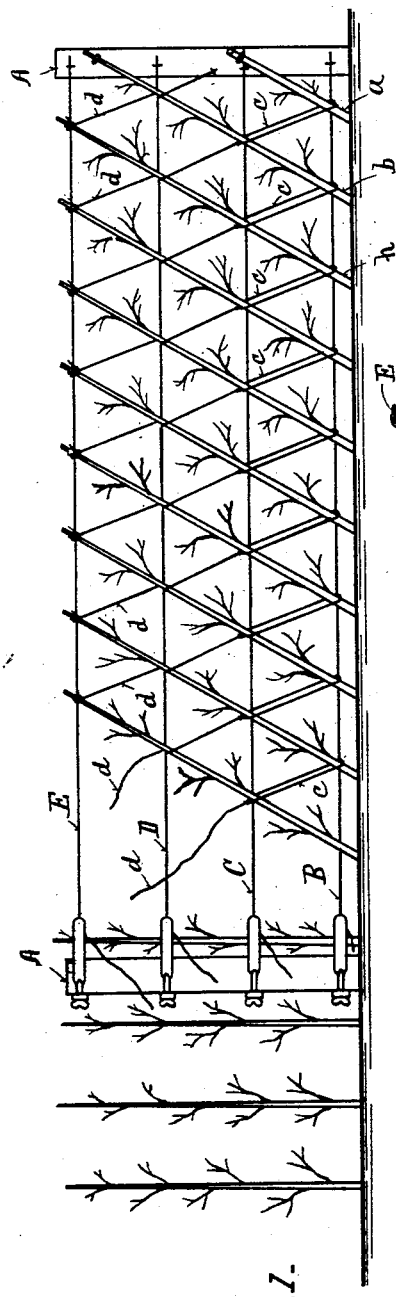
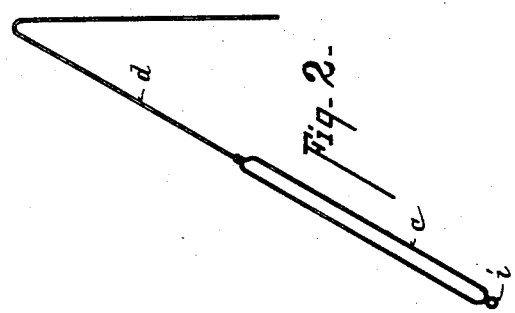
Witnesses
C. W. Miles
Oliver B. Kaiser
Inventor
Lorin Young
by Wood & Boyd
Attorneys

UNITED STATES PATENT OFFICE.

LORIN YOUNG, OF DAYTON, OHIO.

HEDGE FENCE.

SPECIFICATION forming part of Letters Patent No. 591,716, dated October 12, 1897.

Application filed May 14, 1897. Serial No. 636,526. (No model.)

*To all whom it may concern:*

Be it known that I, LORIN YOUNG, a citizen of the United States of America, residing at Dayton, in the county of Montgomery and State of Ohio, have invented certain new and useful Improvements in Hedge Fences, of which the following is a specification.

The object of my invention is to make a plashed hedge fence by bending the plants down with the twigs or branches on and looping them to horizontal wires.

The features of my invention are more fully set forth in the description of the accompanying drawings, making a part of this specification, in which—

Figure 1 is a side elevation of the fence. Fig. 2 is a plan view of one of the loop-wires. Fig. 3 is a side vertical section showing the method of looping the lateral over the horizontal wires.

A A represent posts, between which are stretched wires which are secured to the posts in any appropriate manner.

B C represent the two lower wires which form the base-lines for plashing, and D E the two upper wires.

$a$ $b$ represent the first two plants next to the leading post of the fence.

$c$ represents a wire loop extending around the plant $a$, wire B, wire C, and plant $b$. This looping anchors or holds the plant $b$ in an inclined position.

$d$ represents a secondary wire, which will be hereinafter explained.

$h$ represents the third plant, which is held in the inclined position by a loop $c$. The upper ends of the plant above the base-loop $c$ are secured by the secondary wire $d$, which passes over the plant and under the wire, and attached to the top wire by being bent around the plant and wire together. This secondary wire may be a continuation of the loop $c$ or may be a second wire connected into the loop.

If desired, the loop $c$ may be provided with an eye $i$, as shown in Fig. 2, which is formed by bending the loop-wire around the lower wire B before the loop is formed, and then looping the plants to the wires B C, as explained; but the plants being inclined within the loops prevent the tendency of the loops straightening on the wire, and the eye $i$ is not needed, except where the plants are very flexible.

It has been attempted to hold hedge-plants in their inclined positions by stapling them to horizontal wires or other fastenings; but this is objectionable, first, because it injures the plant, and, second, because it is a tedious mode of fastening the wires. Again, the plants have to be of large size in order that they may be stapled or held in the inclined position by the fastenings hitherto employed; but by employing two base-wires B C and the base-loop $c$, connected to the plants and wires, as shown, the plants are securely held at or near the base and the wires do not injure the plants, because, while the loop is drawn tight enough to hold the plants in their inclined position at the time of plashing, the wire will expand each season during the warm weather, while the plants are growing, and compensate to a great degree by this expansion to the increase of the size of the plants without unduly drawing the wire against the bark. This is a very material feature of my invention.

Having described my invention, what I claim is—

The herein-described plashed hedge fence, consisting of posts, a series of horizontal wires stretched between and secured to said posts along a line of plants, and a series of looped wires embracing the two lowermost horizontal wires and a plurality of plants to hold said plants in an inclined position and a secondary wire extending from said looped wire and engaging the upper courses of horizontal wires to confine the plants thereto, said secondary wires being securely fastened to the topmost horizontal wire, substantially as described.

In testimony whereof I have hereunto set my hand.

LORIN YOUNG.

Witnesses:
F. M. COMPTON,
JOHN H. MEYER.